Oct. 30, 1934.　　　　J. A. PERRY　　　　1,978,758
NONSKID DEVICE FOR VEHICLE WHEELS
Filed June 21, 1933
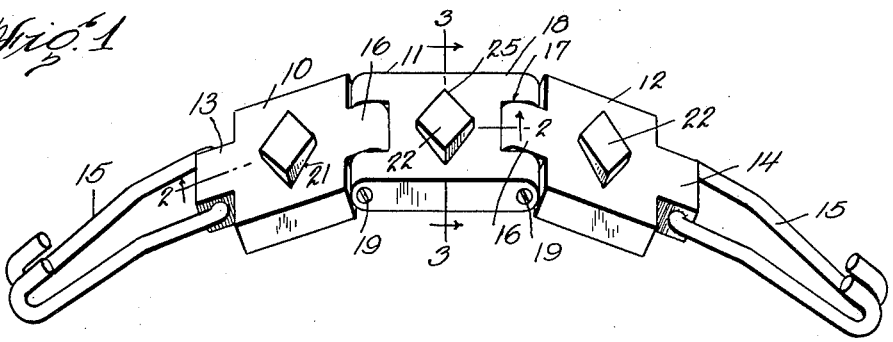
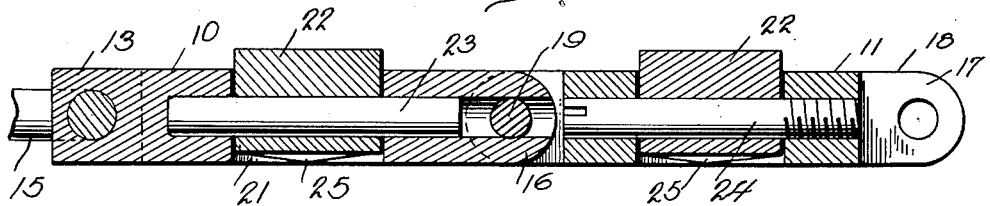
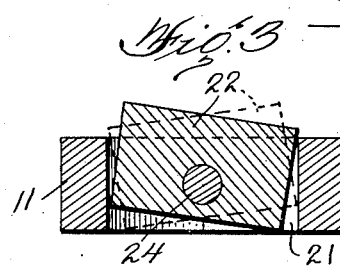
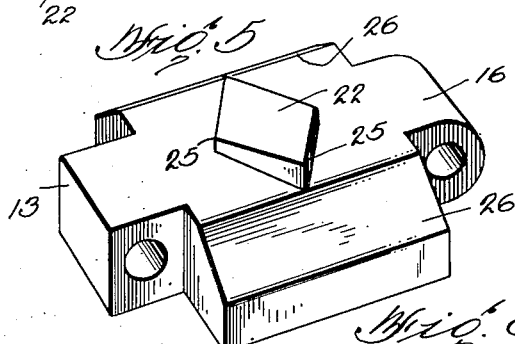
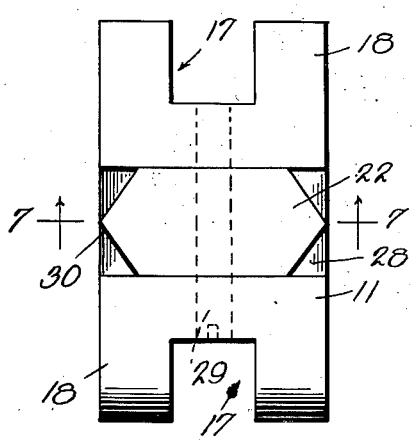
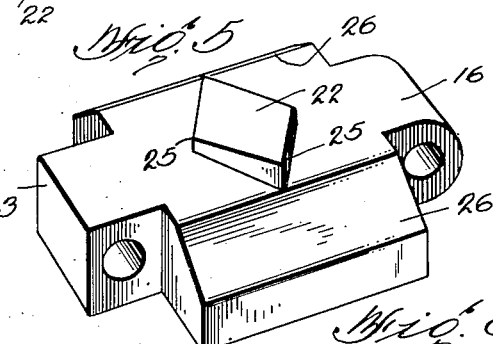
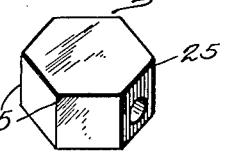
Inventor
Joseph A. Perry
By Watts T. Estabrook
his Attorney Patented Oct. 30, 1934

1,978,758

UNITED STATES PATENT OFFICE 1,978,758

NONSKID DEVICE FOR VEHICLE WHEELS

Joseph A. Perry, Wilkes-Barre, Pa.

Application June 21, 1933, Serial No. 676,958

3 Claims. (Cl. 152—14)

This invention relates to an improvement in non-skid devices for vehicle wheels for use primarily in increasing the traction of a vehicle traveling over snow and ice covered roads and pavements.

The invention consists of a plurality of links hingedly connected together and adapted to be attached in any suitable manner to the felly or spokes of a wheel. The links are each provided with a grouser pivotally connected thereto, and so mounted with respect to the ground engaging surface of the links that the grouser projects beyond the bases of the links and are provided with a plurality of pointed surfaces for engaging the ice to form a gripping engagement for the wheel, these pointed surfaces projecting forwardly, rearwardly and laterally of the links, so that they will eliminate and check any slippage or skidding of the wheels on the icy or wet surface.

The invention consists of certain novel features of construction and combination of parts which will be hereinafter more fully described and pointed out in the claims.

In the accompanying drawing:

Figure 1 is a perspective view of the invention;

Figure 2 is a longitudinal vertical sectional view on line 2—2 of Figure 1;

Figure 3 is a transverse vertical sectional view on line 3—3 of Figure 1;

Figure 4 is a view in elevation of one of the links showing the grouser in contact with the ground;

Figure 5 is a perspective view of one of the end links showing the longitudinal edges bevelled;

Figure 6 is a plan view of a modified form of link and grouser;

Figure 7 is a vertical sectional view of the invention shown in Figure 6; and

Figure 8 is a perspective view of a modified form of grouser or lug.

In the drawing the non-skid device is disclosed as composed of three links 10, 11 and 12, the end links 10 and 12 being provided with the extensions or lugs 13 and 14 respectively, and to which are connected wire or bar metal links 15—15, these links 15 being attached to suitable means such as chains or straps for attaching the non-skid device to the felly or spoke of a wheel, not shown.

It is, of course, to be understood that while only three links 10, 11 and 12 are illustrated, a greater number may be employed, or the size of these links may be increased to accommodate different widths of tires or wheels to which they are to be applied. The several links are preferably made of solid hardened metal which will withstand the abuse and resist the wear to which devices of this character are subjected in facilitating the traction of vehicles over snow, ice and wet road surfaces. The end links 10 and 12 are each provided with lugs 16 and 16 at the ends thereof. The intermediate link 11 is recessed or bifurcated at its ends as at 17, producing ears 18—18. The lug 16 of the end links 10 and 12 are received in a recess 17 of the link 11 and between the ears 18. The ears 18 and lugs 16 are provided with registering transverse openings through which a pintle or pin 19 may be inserted and having screw threaded engagement with one of the ears 18 for pivotally connecting the several links 10, 11 and 12 together.

As illustrated each of these links is provided with a vertical diamond-shaped opening 21 into which are mounted diamond-shaped grousers 22. These grousers are provided with transverse openings for the reception of a pintle or pin 23 which extends lengthwise of the links 10 and 12 through an opening formed through the lug 16 and into the lugs 13, 14 for pivotally supporting the grousers within the diamond-shaped openings 21. The grouser 22 is similarly supported in the link 11 by a pintle 24 which extends lengthwise of the link and has screw threaded engagement with the link at one end of the pintle. These grousers are supported by the pintles 23 and 24, so that their upper surfaces project above the ground engaging surfaces of the links while their inner surfaces are inset from the inner faces of the links. The pintles 23 and 24 pass through the grousers 22 transversely thereof and at one side of the center line of said grousers.

It will be evident that as these grousers are brought into engagement with the tractive surface that they will first be caused to oscillate or pivot, so that the forward ends of the grousers will be projected inwardly into the opening of the link, but a sufficient gripping surface will be presented above the face of the link to engage the road surface whether of ice or what not, and afford a tractive engagement between the wheel and the road surface. As the links assume a horizontal position with respect to the road surface, the grouser will engage the road surface and all of its sides equally presented thereto, so that the pointed edges 25 of the grouser will form a means of penetrating the surface and preventing any skidding either in a lateral, forward or rearward direction. This will also be assisted by the straight edges formed between the pointed portions 25 on the grouser. In Figure 5 the links 10 and 12 may be provided with their longitudinal edges bevelled as at 26.

In Figures 6 and 7 the links are each provided with transverse slots or grooves 28, the base of these grooves being arced or curved, so that the base of the grooves is highest at the center for forming a fulcrum as at 27, for the grouser 22, the grouser being retained in position by pintles or pins 29 passing through the link and grouser to permit it to oscillate or pivot therein. The ends of these grousers are preferably pointed as at 30, and are supported within the links, so that they project above the upper surface thereof forming ground engaging surfaces on all sides thereof.

In Figure 8 is shown another form of grouser which may be substituted for the grouser 22 shown in Figures 1, 2 and 3, and thereby providing a greater number of pointed edges and straight edges for engaging the road surface. Of course, the openings 21 of the links 10, 11 and 12 would have to be shaped to correspond to the configuration of the grouser disclosed in Figure 8.

From the foregoing it will be evident as to the manner in which these grousers are always presented to the road surface for forming the gripping action either in a forward or rearward direction and at the same time preventing any sidewise skidding or slipping of the vehicle. Further, the several parts can be readily assembled and replacements made as any of the links or grousers become worn. Naturally, the grousers will be subjected to the greatest amount of wear, and while they are to be constructed of very hard and durable metal, they can be easily replaced and removed from the links upon the withdrawal of the pintles 23 or 24 as the case may be.

The grousers 22 are so mounted with respect to the links that sufficient space is afforded for the egress of moisture, ice and foreign matter between the walls of the openings in the links and the walls of the grousers, so that the possibility of the grousers being prevented from oscillating is eliminated. Further, by insetting the grousers with respect to the upper face or the face of the links coming in contact with the tire, space is afforded for such foreign matter to escape and eventually be discharged from the links between the links and the tire.

I claim:

1. In a non-skid device for vehicle wheels comprising a plurality of pivotally connected links, each link provided with a diamond-shaped opening, diamond-shaped grousers mounted in an opening of each link and capable of oscillatory movement within said opening, and means for supporting the grouser above the outer or ground engaging surface of each link that the edges of said grouser may form gripping surfaces for effecting traction and resisting skidding movement.

2. In a non-skid device for vehicle wheels comprising a plurality of pivotally connected links, each link provided with a diamond-shaped opening, diamond-shaped grousers mounted in an opening of each link and capable of oscillatory movement within said opening, and means extending longitudinally of each link and transversely of each grouser for pivotally mounting the grousers in the openings of the links and supporting the grousers beyond the ground engaging surfaces of the links that the edges of the grousers may afford effective traction and resistance to skidding movement.

3. In a non-skid device for vehicle wheels comprising a plurality of pivotally connected links, each link provided with an opening, a grouser provided with a plurality of angular gripping means mounted in an opening of each link and capable of oscillatory movement within said opening, and separate means extending through each link and each grouser for pivotally mounting each grouser in an opening of the links and supporting the grousers beyond the ground engaging surfaces of the links that the angular gripping means of the grousers may afford effective traction and resistance to skidding movement.

JOSEPH A. PERRY.